Patented June 16, 1953

2,642,414

UNITED STATES PATENT OFFICE 2,642,414

COPOLYMERS OF MALEIC ESTERS AND LONG CHAIN ALKYL METHACRYLATES

La Verne N. Bauer, Philadelphia, Harry T. Neher, Bristol, and William L. Van Horne, Philadelphia, Pa., assignors to Rohm & Haas Company, Philadelphia, Pa., a corporation of Delaware No Drawing. Application February 3, 1950, Serial No. 142,338

6 Claims. (Cl. 260—78.5)

This invention concerns copolymers of a methacrylic ester (A) of methacrylic acid and a saturated aliphatic monohydric alcohol, ROH, having a carbon chain of 16 to 18 carbon atoms, and a maleinoid ester (B) of a saturated aliphatic monohydric alcohol of 4 to 14 carbon atoms and an acid of the formula $HOOCC(X)=CHCOOH$, wherein X is hydrogen, chlorine, or the methyl group, the proportion of ester (A) units to ester (B) units being within the ratios defined herein. This invention also deals with compositions of matter which comprise a wax-containing oil having dissolved therein a copolymer as above described in an amount at least sufficient to depress the normal pour point of the oil.

Resinous or polymeric materials have been added to hydrocarbon fluids for such purposes as increasing the viscosity of the oil, improving the temperature-viscosity behavior thereof, or lowering the pour point. The influence of a polymer on the pour point of an oil is not predictable. Some polymers raise the pour point and others have little if any effect thereon. Lowering of the pour point is a much desired effect, obtainable with a limited number of types of polymeric materials. A wider choice of materials giving this effect is greatly to be desired.

Depression of pour point is not effected by polymers of cetyl methacrylate or stearyl methacrylate. Polymers of such maleinoid esters as dihexyl maleate, dihexyl fumarate, dihexyl citraconate, dioctyl maleate, dioctyl chloromaleate, didecyl maleate, didodecyl citraconate, or the like are likewise not of value as pour point depressants. Mechanical mixtures of the various polymers fail to depress the pour point of oils. Yet the copolymers herein defined are of considerable value as oil-additives for lowering pour points.

The esters which enter into the copolymers of this invention are on the one hand methacrylic esters having as the alcohol residue an alkyl group having a chain of 16 to 18 carbon atoms and on the other hand maleinoid esters. The methacrylates include cetyl methacrylate, heptadecyl methacrylate, stearyl or octadecyl methacrylate, or mixtures of these methacrylates or mixtures of such methacrylates in which the alcohol residues are derived from commercial cuts of higher fatty alcohols.

The maleinoid esters include in their various isomeric forms butyl, amyl, hexyl, heptyl, octyl, nonyl, decyl, dodecyl, and tetradecyl esters of maleic, fumaric, chloromaleic, citraconic, and mesaconic acids. The alkyl groups may be of straight or branched chains. The two alkyl groups in the ester may be the same or different. The esters may be prepared by stepwise reaction of an acid or an anhydride with one equivalent of an alcohol and then with an equivalent of another alcohol. Similar results can be obtained by reaction of acid or anhydride with a mixture of alcohols.

Typical maleinoid esters are dibutyl maleate, diisobutyl maleate, dibutyl fumarate, dibutyl chloromaleate, dibutyl citraconate, dibutyl mesaconate, di-sec.-butyl maleate, butyl tert.-amyl maleate, di-n-hexyl maleate, di-n-hexyl chloromaleate, di-2-ethylbutyl maleate, di-2-ethylbutyl fumarate, di-2-ethylhexyl maleate, chloromaleate, fumarate, citraconate, or mesaconate, di-n-octyl maleate, di-n-octyl citraconate, butyl octyl maleate, di-3,5,5,-trimethylhexyl maleate, chloromaleate, fumarate, or citraconate, didecyl maleate, didodecyl maleate, didodecyl fumarate, dodecyl octyl maleate, dodecyl octyl fumarate, butyl dodecyl citraconate, dimyristyl maleate, dodecyl myristyl maleate, di-isotetradecyl maleate, and the like.

The two types of esters, methacrylate and maleinoid, are copolymerized within proportions which depend upon the number of carbon atoms in the straight chain of the alkyl group of the maleinoid ester. The maximum amount of maleinoid ester which may be used per mole of methacrylic ester is defined by the proportion $x:1$, where $x$ is moles of maleinoid and is determined by the equation $0.7n-x=0.3$, where $n$ is the number of carbon atoms in the longest chain of the alkyl group of the maleinoid esters or one half the sum of the number of carbon atoms in each of the longest chains of two different alkyl groups. The proportion defining the minimum amount of maleinoid ester is $y:1$, where $y$ is the number of moles of maleinoid ester and is determined by the equation $0.022n-y=0.013$, $n$ being defined as above.

Copolymerization is effected under conditions that ensure true copolymerization and not separate polymerization of the two types of esters. The copolymerization reaction is usually carried out in the presence of an inert organic solvent for both the monomers and the copolymers, such as benzene, toluene, xylene, a volatile petroleum naphtha, or similar volatile solvent. A polymerization catalyst is added to a mixture of the two types of esters. Amounts of catalyst used may vary from 2.5% to 15% of the weight of the monomers. In a preferred method there may be added 1% to 6% of catalyst at the start and more catalyst is added as copolymerization proceeds. Solvent is also added desirably from time to time to ensure that the copolymer remains in solution.

Catalysts for copolymerization include organic peroxides and acyclic azo compounds. Typical azo compounds are azodiisobutyronitrile and azodiisobutyrates, including esters, such as the methyl or ethyl esters. Suitable peroxides are acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butyl peroxy)butane, methyl ethyl ketone peroxide, di-tert.-butyl peroxide, tert.-butylhydroperoxide, etc.

Catalyst is added to the monomers and the mixture is heated to 75° C. to 150° C. One temperature range may be used at the start and another as copolymerization proceeds. Optimum temperatures depend on solvent selected, concentration of monomers, concentration of catalyst, copolymerization schedule, and time. The variables are fixed with regard to the intended type of copolymer and its molecular size. Soluble copolymers are thus obtainable with apparent molecular weights of about 1000 to 25,000 or more. The copolymers of relatively large molecular size act not only as pour point-depressants but also as viscosity index-improvers. They may also serve to increase the viscosity of oils in which they are dissolved.

The following illustrative examples present details of typical preparations of various copolymers of this invention. Parts are by weight.

Example 1

A reaction vessel equipped with stirrer, thermometer, reflux condenser, inlet tube for admitting nitrogen gas, and funnel for adding material was charged with a mixture of 72 parts of cetyl methacrylate, 28 parts of didodecyl monochloromaleate, 50 parts of toluene, and 5 parts of benzoyl peroxide. The vessel was heated to 120° C. by means of an oil bath. Additions of catalyst were made as follows: at 2.7 hours, 2 parts; at 4.9 hours, 5 parts; at 5.9 hours, 2 parts; and at 6.9 hours, 0.8 part. Solvent was added as follows: at 5.9 hours, 100 parts and at 6.9 hours, 100 parts. The temperature was held at 115°–120° C. for 4.7 hours and then reduced to 103°–105° C. until the eighth hour when heating was discontinued. There was obtained a solution containing 28.5% of copolymer. The viscosity of this solution was 452 centistokes at 100° F.

The copolymer was transferred to a light lubricating oil by mixture therewith and stripping of solvent under reduced pressure. Heating was carried to a temperature of 140° C. at 1 mm. The oil solution added in small amounts to wax-containing oils effectively lowered their pour points.

Example 2

By a somewhat similar procedure there were copolymerized 90 parts of octadecyl methacrylate and 110 parts of didodecyl citraconate, prepared from carefully refractionated dodecyl alcohol, distilling at 128° C./10 mm. to 130° C./5 mm. of about 97% purity. The two monomers were mixed with 10 parts of benzoyl peroxide and the mixture introduced slowly into the reaction vessel at 110°–120° C. over the course of 1.8 hours. Heating was continued at 112° C. until 4.25 hours with addition of 4 parts of benzoyl peroxide at 2.9 hours. At 4.25 hours the temperature was allowed to fall to 101° C. and held at 100°–101° C. until 7.5 hours. Additions of 10 parts of peroxide was made at 4.5 hours; 4 parts at 5.5 hours; and 1.6 parts at 6.5 hours. Toluene was added at 5.25 hours (40 parts), at 5.5 hours (100 parts), at 6.2 hours (100 parts), and at 6.5 hours (110 parts). Heating was discontinued at 7.5 hours. The resulting product contained 34.5% of oil-soluble copolymer. A 30% solution in toluene had a viscosity of 164.5 centistokes at 100° F.

A mixture of 39.7 parts of the above product, 6.2 parts of the 30% toluene solution, and 23.3 parts of a light lubricating oil was stirred and heated up to 140° C./1 mm. The product was a 35.5% solution of copolymer in oil. When this product was added in small concentrations to waxy oils, a marked lowering of their pour points was obtained. It also improved the viscosity index of oils.

Repetition of the above procedure with didodecyl mesaconate in place of the citraconate leads to a similar copolymer. The 30% solution thereof has a viscosity of 69 centistokes at 100° F.

Example 3

A mixture of 189.5 parts of cetyl methacrylate, 10.5 parts of di-n-butyl fumarate, 200 parts of a close cut aromatic naphtha, and 10 parts of benzoyl peroxide was heated for 7.75 hours at 116°–121° C. for the first 4.4 hours and at 100°–105° C. for the remaining time. At 2.8 hours 4 parts of peroxide in 4 parts of solvent, at 4.9 hours, 10 parts of peroxide in 30 parts of solvent, at 5.9 hours, 4 parts of peroxide in 50 parts of solvent, and at 6.9 hours, 1.6 parts of peroxide in 20 parts of solvent were added. There was obtained a 43.3% solution of copolymer. A 30% solution of copolymer had a viscosity of 27.8 centistokes at 100° F.

This copolymer was markedly effective in reducing pour points of wax-containing oils.

Example 4

There was copolymerized by a method similar to that of Example 2 196 parts of stearyl methacrylate and 1804 parts of dilauryl maleate with 100 parts of benzoyl peroxide present at the start. The stearyl alcohol used in preparation of the methacrylate contained 85% of octadecyl alcohol, the balance being homologous alcohols of 12 to 16 carbon atoms. The lauryl alcohol used was a commercial product containing 85% of dodecyl alcohol, 12% of myristyl alcohol, and 3% of decyl alcohol. The temperature for the first four hours was about 120° C. and for the balance of the reaction period of 7.5 hours was 103° C.–105° C. Peroxide was added as follows: at 2.8 hours, 40 parts; at 4.25 hours, 100 parts; at 5.25 hours, 40 parts; and at 6.25 hours, 16 parts. Toluene was added at 5.25 hours in an amount of 500 parts and at 7.5 hours, 2000 parts. The product was a 40.8% solution of copolymer in toluene. A 30% solution in toluene had a viscosity of 5.2 centistokes at 100° F.

Example 5

The procedure of Example 4 was followed with 320 parts of octadecyl methacrylate and 1680 parts of didodecyl fumarate. The dodecyl group was that of branched chained dodecyl alcohols obtained from olefines by the "oxo" reaction. The product was a 45% solution in toluene. A 30% solution had a viscosity of 11.3 centistokes at 100° F.

Example 6

A mixture starting with 75 parts of octadecyl methacrylate, 29 parts of dimyristyl fumarate, 5 parts of benzoyl peroxide, and 110 parts of toluene was heated as above for four hours at 115°–123° C. and for four hours at 100°–105° C. Additions were made of catalyst from time to time amounting to 9.8 parts. The product was a 45% solution of copolymer. A 30% solution of this copolymer in toluene had a viscosity of 8.8 centistokes at 100° F.

Example 7

By the previous procedure there were copolymerized 52.9 parts of hexadecyl methacrylate and 47.1 parts of di(3,5,5-trimethylhexyl)maleate, starting with 5 parts of benzoyl peroxide and 50 parts of toluene. Additions were made of 100 parts of toluene and 9.8 parts of catalyst. The product was a 37% solution of copolymer in toluene. A 30% solution had a viscosity of 5.0 centistokes at 100° F.

Example 8

A mixture of 81.2 parts of cetyl methacrylate and 118.8 parts of dibutyl maleate in 21 parts of toluene was treated with 16.8 parts of lauroyl peroxide and heated at 119°–121° C. for four hours and then at 105° C. for four hours. Additions of lauroyl peroxide were made from time to time amounting to 49.7 parts. Additions of solvent amounted to 60 parts. The solution of copolymer thus formed contained 70.4% of copolymer which in 30% solution gave a viscosity of 2.3 centistokes at 100° F.

Another method of preparing suitable copolymers for use as oil additives is through preparation of heteropolymers from maleic anhydride followed by reaction of copolymer with an alcohol of four to fourteen carbon atoms equivalent to one of the alcohols shown above in conjunction with the useful maleinoid esters. Thus, 67.7 parts of octadecyl methacrylate (0.2 mole) and 19.8 parts of maleic anhydride in 100 parts of benzene were heated with 2.2 parts of benzoyl peroxide at 83°–87° C. for 2.5 hours. The batch became very viscous. Peroxide was added in four increments of 0.9, 0.5, 0.3, and 0.2 parts between 2.5 hours and 7 hours. Thereupon 74.5 parts of dodecyl alcohol was added followed by 0.5 part of sulfuric acid. The temperature was raised to 93° C. for 0.5 hour. The batch was allowed to stand without heating for 16 hours. The batch was then heated under reflux with addition of one part of sulfuric acid and water of esterification separated. Some benzene was distilled off. The batch was washed with sodium bicarbonate solution and water, and dried. A 21.8% solution of copolymer was obtained. It was mixed with a light lubricating oil and the mixture heated to 140° C./1 mm. to give a 28.9% solution of copolymer in oil. This was an effective additive for depressing the pour point of oils having a waxy pour point.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97-47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at —60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (oil I). This was an oil which proved to be relatively sensitive to the action of pour point depressants. The second oil (oil II) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F. A third oil (oil III) was a 500 Mid-Continent solvent-extracted neutral (S. A. E. 30) having a pour point of +25° F. This was known to be an oil which was not readily changed as to its pour point.

A copolymer from cetyl methacrylate and di(isobutyl) maleate in a 1:0.5 mole ratio when dissolved in oil I at 0.5% and at 0.25% depressed the pour point 30° F. and at 0.1% and 0.04%, 25° F. In oil III the pour point was —10° F. with 0.5% of copolymer.

A copolymer from cetyl methacrylate and dibutyl maleate in a 1:0.075 mole ratio depressed the pour point of oil I 35° F. at 0.5% and also at 0.25% and 30° F. at 0.1%. In oil II the pour point was +5° F. at 0.1% of copolymer. At 0.5% in oil III the pour point was lowered to —15° F.

A copolymer from cetyl methacrylate and dibutyl fumarate in a 1:1 mole ratio depressed the pour point of oil I 45° F. at 0.5% and 0.25%, 40° F. at 0.1%, and 30° F. at 0.04%. In oil II the depression caused was 25° F. at 0.1%. In oil III at 0.5% the depression caused was 35° F. The maximum pour test in oil III was 0° F. at 0.5% of copolymer.

A copolymer from cetyl methacrylate and dibutyl maleate in a 1:2 mole ratio was dissolved in oil I. At 0.25% and 0.5% it lowered the pour point to —20° F. At 0.1% the pour point was —15° F. The same pour points were obtained with a copolymer in which dibutyl fumarate was substituted for the above maleate.

A copolymer from cetyl methacrylate and dibutyl maleate in a mole ratio of 1:3 caused the pour point of oil I to be +30° F. at 0.25%.

A copolymer from cetyl methacrylate and di-(3,5,5-trimethylhexyl)maleate in a 1:0.75 mole ratio caused a depression of the pour point of oil I from +25° F. to —30° F. at 0.5%, to —25° F. at 0.25%, to —10° F. at 0.1%, and to 0° F. at 0.04%. In oil III at 0.5% the copolymer reduced the pour point to —20° F.

A copolymer from cetyl methacrylate and didodecyl maleate in a 1:0.25 mole ratio was found to depress the pour point of oil I to —20° F. at 0.5% and 0.25% of copolymer, to —15° F. at 0.1%, and —10° F. at 0.04%. In oil II the pour point became —5° F. with 0.1% of copolymer and in oil III a depression of 40° F. was obtained at 0.5% of copolymer.

A copolymer from cetyl methacrylate and ditetradecyl fumarate in a mole ratio of 1:0.5 depressed the pour point of oil I to —40° F. at a concentration of 0.5%, to —30° F. at a concentration of 0.25% and to —20° F. at a concentration of 0.1%.

A copolymer from octadecyl methacrylate and dibutyl maleate in a mole ratio of 1:2.5 caused the pour point of oil I to become 0° F. at 0.5% of copolymer. A copolymer from the same esters in a 1:1.13 mole ratio gave the identical result at 0.5%.

A copolymer from octadecyl methacrylate and didodecyl maleate in a 1:0.62 mole ratio in oil I at 0.25% gave a pour point of −20° F., in oil II at 0.1%, 0° F., and in oil III at 0.5%, −20° F.

A copolymer from octadecyl methacrylate and didodecyl maleate in a 1:0.15 mole ratio failed to depress the pour point of oil II or oil III and gave only a few degrees depression in oil I.

A copolymer from octadecyl methacrylate and didodecyl citraconate in a 1:0.89 mole ratio lowered the pour point of oil I to −15° F. at 0.5% and 0.25%, and to −5° F. at 0.1%. It lowered the pour point of oil III to −5° F. at 0.5%.

A copolymer from octadecyl methacrylate and didodecyl mesaconate in a 1:0.92 mole ratio gave a depression of 40° F. at 0.25% in oil I, and of 30° F. at 0.5% in oil III.

A polymer was made from stearyl methacrylate. It was dissolved in oil I at 0.25%, but failed to change the pour point. Similarly a polymer of didodecyl citraconate was dissolved in oil I at 0.25%. This solution had the same pour point as oil I without polymer. A mixture was made of these two polymers in a weight ratio of 45:55. This is a mole ratio of 0.89:1. With 0.25% of the mixed polymers in oil I the pour point was +25° F.

A copolymer from octadecyl methacrylate and didodecyl maleate in 1:8 mole ratio depressed the pour point of oil I when 0.5% was dissolved therein to −30° F. At 0.1% the pour point was found to be −5° F. In oil III 0.5% of the copolymer depressed the pour point to −20° F. It may be commented that the higher maleinoid esters are less critical as to the upper proportions which may be copolymerized than the dialkyl maleates with alkyl groups of ten or fewer carbon atoms. Nevertheless, a copolymer from octadecyl methacrylate and didodecyl maleate in a 1:9.3 mole ratio failed to give any depression at 0.5% in oil I.

Polymeric cetyl methacrylate when dissolved in waxy oils fails to lower their pour points. Likewise octadecyl methacrylate polymer does not lower their pour points. Polymers were prepared from dihexyl maleate, dioctyl maleate, di(3,5,5-trimethylhexyl) maleate, didecyl maleate, dioctyl fumarate, didodecyl citraconate, and didodecyl chloromaleate. Not one of these polymers depressed the pour point of any of the test oils. Next, mixtures of these maleinoid ester polymers were made with polymers of cetyl methacrylate and octadecyl methacrylate. These mechanical mixtures failed to depress pour points. For example, a mixture of cetyl methacrylate polymer and di(3,5,5-trimethylhexyl)maleate in a mole ratio of 1:0.75 was dissolved in oil I at 0.5% of the mixture. The pour point was +30° F.

While the copolymers of this invention depress the pour point of oils having a waxy pour point without particular dependence on the extent of polymerization, their influence on viscosity and improvement of viscosity-temperature relationships is related to molecular size. When molecular weights of the order of 5000 or more are attained, the copolymers of this invention act as improvers of viscosity index. A copolymer of octadecyl methacrylate and didodecyl citraconate in a mole ratio of 1 to 0.89 was prepared. A 30% solution of copolymer in toluene had a viscosity of 165 centistokes at 100° F. It was dissolved in oil I at 0.5%. The viscosity of the solution was 5.55 centistokes at 210° F. and 33.71 centistokes at 100° F., compared with viscosities for the oil without additive of 5.15 centistokes at 210° F. and 30.9 centistokes at 100° F. The original oil thus has a viscosity index of 106.9. The oil with 0.5% of the above copolymer has a viscosity index of 112.3. A 2% solution of this copolymer in oil I has viscosities of 6.94 centistokes at 210° F. and 41.60 centistokes at 100° F., the viscosity index being 130.3.

Copolymers were prepared with varying proportions of octadecyl methacrylate and didodecyl fumarate and were tested in oil I. With a mole ratio of 1:9 the copolymer at 0.5% did not change the pour point. A copolymer with a mole ratio of 1:8 depressed the pour point at 0.5% 30° F. and at 0.25% 5° F. A copolymer from a 1:7 mole ratio of the two monomers depressed the pour point 40° F. at 0.5% and 10° F. at 0.25%. A copolymer based on a mole ratio of 1:1.4 gave depressions of 40° F. at 0.5% and 25° F. at 0.25%. A copolymer with a mole ratio of 1:0.3 gave a depression of 30° F. at 0.5%.

The 1:1.4 copolymer gave a viscosity of 239 centistokes at 100° F. in a 30% toluene solution and gave a definite improvement in viscosity index. This illustrates the fact that the copolymers based on fumarates can be carried to relatively high molecular weights without difficulty. They then have not only the pour depressing activity common to all of the copolymers of this invention but additional value.

A series of copolymers was studied, prepared from cetyl methacrylate and didodecyl fumarate in a range of mole ratios. Depressions of 25° F. to 40° F. were obtained with solutions of the copolymers at 0.5% in oil I over the range 1:0.25 to 1:8 of mole ratios.

A copolymer from octadecyl methacrylate and a didodecyl fumarate in which the dodecyl groups were branched and obtained from alcohols prepared by reaction of olefines, carbon monoxide, and hydrogen in the presence of a cobalt catalyst was prepared in a 1:4 mole ratio. At 0.5% in oil I it depressed the pour point 40° F.

The data indicate that copolymers from long chained alkyl methacrylates and dialkyl maleinoid esters in which the alkyl groups vary in chain length from 4 to 14 are effective pour point depressants when certain mole ratios of the two kinds of monomers are taken for copolymerization. For di-n-butyl maleate, fumarate, chloromaleate, citraconate or mesaconate there must be taken at least 0.075 mole for one mole of octadecyl or cetyl methacrylate, while for di-isobutyl maleate the lower limit is somewhat more than 0.05. The maximum mole ratio of a di-n-butyl maleinoid ester is between two and three and may well be taken as 2.5:1. For the di-isobutyl maleinoid esters the maximum ratio of such ester to methacrylate is less than two. When di-n-dodecyl maleate and long chained alkyl methacrylate are copolymerized, pour depressing copolymers are obtained when one mole of methacrylate and 0.25 mole of maleate (or its equivalent) are copolymerized. Effective copolymers are obtained when the ratio is one mole of methacrylate to eight moles of didodecyl maleate. When dimyristyl maleate is used, from about 0.3 mole to about 9.5 moles thereof per mole of methacrylate give effective copolymers.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

We claim:

1. A copolymer of an ester (A) of methacrylic acid and a saturated monohydric aliphatic alcohol, ROH, in which R is an alkyl group having a chain of 16 to 18 carbon atoms, and an ester (B) of at least one saturated monohydric aliphatic alcohol, R'OH, in which R' is an alkyl group of 4 to 14 carbon atoms, and a maleic-type acid, $HOOCC(X)=CHCOOH$, in which X is a member of the class consisting of hydrogen, chlorine, and the methyl group, the proportion of ester (A) groups to ester (B) groups in the copolymer being within the following ratios, $1:x$ and $1:y$, the value of $x$ being determined by the equation $0.7n-x=0.3$ and the value of $y$ being determined by the equation $0.022n-y=0.013$, $n$ representing the number of carbon atoms in the longest straight chain of R'.

2. A copolymer of cetyl mechacrylate and di-n-butyl maleate in mole ratios from 1:0.075 to 1:2.5.

3. A copolymer of cetyl methacrylate and di-n-dodecyl maleate in mole ratios from 1:0.25 to 1:8.

4. A copolymer of octadecyl methacrylate and di-n-dodecyl maleate in mole ratios from 1:0.25 to 1:8.

5. A copolymer of octadecyl methacrylate and didodecyl fumarate in mole ratios from 1:0.25 to 1:8.

6. A copolymer of cetyl methacrylate and didodecyl fumarate in mole ratios from 1:0.25 to 1:8.

LA VERNE N. BAUER.
HARRY T. NEHER.
WILLIAM L. VAN HORNE.

References Cited in the file of this patent

UNITED STATES PATENTS

| Number | Name | Date |
| --- | --- | --- |
| 2,047,398 | Voss | July 14, 1936 |
| 2,067,234 | Gordon | Jan. 12, 1937 |
| 2,286,251 | Arnold | June 16, 1942 |
| 2,366,517 | Gleason | Jan. 2, 1945 |
| 2,514,895 | Neher et al. | July 11, 1950 |
| 2,560,588 | Munday | July 17, 1951 |
| 2,580,053 | Tutwiler | Dec. 25, 1951 |